(12) United States Patent
Yan (10) Patent No.: US 10,112,306 B2
(45) Date of Patent: Oct. 30, 2018

(54) AUTO-REDIRECTING ROBOT AND THE METHOD THEREOF

(71) Applicant: Jason Yan, New Taipei (TW)

(72) Inventor: Jason Yan, New Taipei (TW)

( * ) Notice: Subject to any disclaimer, the term of this patent is extended or adjusted under 35 U.S.C. 154(b) by 0 days.

(21) Appl. No.: 14/882,444

(22) Filed: Oct. 13, 2015

(65) Prior Publication Data

US 2017/0028570 A1 Feb. 2, 2017

(30) Foreign Application Priority Data

Jul. 30, 2015 (TW) .............................. 104124651 A (51) Int. Cl.
*B25J 13/08* (2006.01)
*B25J 9/16* (2006.01)

(52) U.S. Cl.
CPC ........... *B25J 13/086* (2013.01); *B25J 9/1676* (2013.01); *G05B 2219/37605* (2013.01)

(58) Field of Classification Search
CPC ......... B25J 19/027; G05B 2219/37605; G05B 19/41895; Y10S 901/01; G05D 1/0238–1/0242
USPC ......... 700/253, 258, 255; 901/1; 318/568.12
See application file for complete search history.

(56) References Cited

U.S. PATENT DOCUMENTS

| | | | | |
|---|---|---|---|---|
| 6,809,490 B2 * | 10/2004 | Jones | ................... | G05D 1/0219 318/568.12 |
| 2002/0016649 A1 * | 2/2002 | Jones | ................... | G05D 1/0238 700/245 |
| 2005/0251292 A1 * | 11/2005 | Casey | ................... | G05D 1/0238 700/245 |
| 2006/0229774 A1 * | 10/2006 | Park | ..................... | G05D 1/0238 701/23 |
| 2008/0015738 A1 * | 1/2008 | Casey | ................... | G05D 1/0238 700/258 |
| 2008/0276407 A1 * | 11/2008 | Schnittman | ............. | A47L 11/34 15/319 |
| 2012/0065829 A1 * | 3/2012 | Yu | ......................... | G05D 1/0227 701/23 |
| 2012/0173070 A1 * | 7/2012 | Schnittman | .......... | G05D 1/0227 701/26 |
| 2012/0232696 A1 * | 9/2012 | Tang | ....................... | A47L 9/009 700/258 |
| 2015/0032259 A1 * | 1/2015 | Kim | ...................... | A47L 9/2805 700/255 |
| 2015/0142169 A1 * | 5/2015 | Kim | ...................... | A47L 11/282 700/245 |
| 2016/0299503 A1 * | 10/2016 | Wolfe | ................... | A47L 9/2805 |

* cited by examiner

Primary Examiner — Bao Long T Nguyen
(74) Attorney, Agent, or Firm — Chun-Ming Shih (57) ABSTRACT

An auto re-directing robot able to adjust its moving paths automatically and a method thereof are disclosed in present invention. The auto re-directing robot has a control module, which may generate a signal standard value according to the bounced-back signals from an obstacle. Then, the control module determines a keep-away distance between the robot and the obstacle. In the case, the robot needs not to touch the obstacle repeatedly for determining whether it should change its moving path. In addition, when the robot encounters obstacles with different properties, the robot can adapt to change its paths automatically based on the properties of the obstacles.

12 Claims, 5 Drawing Sheets

AUTO-REDIRECTING ROBOT AND THE METHOD THEREOF

BACKGROUND OF THE INVENTION

1. Field of the Invention

The invention relates to a robot. More particularly, the invention relates to an auto-redirecting robot which can automatically adjust its moving paths according to the properties of each obstacle and a method thereof.

2. Description of the Prior Art

As the progression of science and technology, robots have been widely used in many fields such as cleaning, dangerous tasks and other household and military applications to save manpower and meanwhile avoid danger.

In recent days, most of robots are set with sensors to determine the necessity of modifying their current path. However, a robot in the prior art might have collisions with an obstacle repeatedly as a method for altering its current path, but it meanwhile generates a lot of noises and shortens the service life of the robot.

Also, in the prior arts, most of robots has transmitters to send signals to an obstacle and then has another receiver to receive bounced-back signals from the obstacle. However, such robot cannot distinguish obstacles with different properties therefore many problems occur, such as slowness in processing and misjudgments. Therefore, said problem would result in many violent collisions, it causes inconvenience in practical use and usually damages the robot.

To overcome said problems of the prior art robots, the inventor dedicates in the subject and has successfully come up with a robot and method of the present invention.

SUMMARY OF THE INVENTION

An object of the present invention is to provide a robot that can calculate the distance to be kept between the robot and an obstacle and that does not need to touch the obstacle frequently for determining whether it should change its path of moving. Another object of the present invention is to provide a robot that can operate normally whether the encounter obstacles with different material properties.

To reach aforementioned objects, a robot of the present invention is provided, which comprises a main body, a control module, a plurality of driving modules, a plurality of signal transmitters, a plurality of signal receivers and a plurality of sensors. The control module is disposed inside the main body. Said driving modules, said signal transmitters, said signal receivers and said sensors are set on the sides of the control module.

As the main body of the robot moves alongside an obstacle, the signal transmitters send out signals to the obstacle and then the signal receivers may receive the bounced-back signals from the obstacle. Said signals can be infrared radiation, laser, electromagnetic wave or energy beam.

The control module controls the driving modules to move the main body alongside the obstacle. As the main body touches the obstacle, one of the sensors is activated and the control module controls the driving modules for moving the main body away from the obstacle. Also, the control module generates a signal characteristic change based on the bounced-back signals received by the signal receivers. Then, the control module generates a signal standard value according to said signal characteristic change. The control module determines a keep-away distance between the main body and the obstacle based on the signal standard value. After the keep-away distance is determined, the control module controls the driving modules for moving the main body alongside meanwhile keeping said keep-away distance from the obstacle.

If the properties of the obstacle changed or the bounced-back signals from the obstacle are inconsistent with the signal standard value, the control module would control the driving modules to move the main body towards the obstacle until any of the sensors touches the obstacle and then the control module controls the driving modules for moving the main body away from the obstacle. Said properties of the obstacle include color and superficial smoothness.

If the signal receivers do not receive any signal, the control module controls the driving modules to turn the main body to and then move alongside the obstacle.

The control module further comprises a memory module, in which said bounced-back signals, signal characteristic changes and signal standard values are stored.

The present invention also provides a method to auto-redirect the moving paths of the robot. In the method, a robot's main body has a control module, which controls a plurality of driving modules to move the main body alongside an obstacle. Said robot also has a plurality of signal transmitters disposed on the sides of the main body, which sends signals to said obstacle. Then, the bounced-back signals from the obstacle are received by a plurality of signal receivers, also disposed on the sides of the main body.

As the main body touches the obstacle, one of the sensors would be activated and the control module would control the driving modules to move the main body away from the obstacle. Also, the control module generates a signal characteristic change based on the bounced-back signals received by the signal receivers. Then, the control module generates a signal standard value according to the signal characteristic change.

The control module uses the signal standard value to determine a keep-away distance between the main body and the obstacle. After the keep-away distance is determined, the control module controls the driving modules to drive the main body moving alongside the obstacle meanwhile keeping the keep-away distance from the obstacle.

The method further comprises following steps: (a) The control module sets the instant location as a starting point for the first time any of the sensors touches the obstacle. (b) Bounced-back signals from the obstacle are received by the signal receivers of the main body then a signal characteristic change is generated. A touch signal is generated when each time any of the sensors touches the obstacle and every touch signals generated are gathered by the control module, the control module generates said signal characteristic change based on gathered touch signals, and said signal characteristic change is the base for generating the signal standard value.

If the properties of the obstacle changed or the bounced-back signals from the obstacle are inconsistent with the signal standard value, the control module would control the driving modules to move the main body towards the obstacle until any of the sensors touches the obstacle and then the control module controls the driving modules for moving the main body away from the obstacle. Said properties of the obstacle include color and superficial smoothness.

If the signal receivers do not receive any signal, the control module controls the driving modules to turn the main body to and then move alongside the obstacle.

The control module further comprises a memory module, in which said bounced-back signals, signal characteristic changes and signal standard values are stored.

The auto-redirecting robot and the method thereof in present invention provide following advantages:
1. With the association of the control module and the signal standard values, the robot need not to have frequent collisions with the obstacle for determining a proper distance to be kept between its main body and the obstacle. Therefore, unnecessary noises and robot damages are reduced, which extends the service life of the robot.
2. With the association of the control module and the signal standard values, the robot can auto-redirect its moving paths and reduce the errors and misjudgments due to obstacle's properties. Therefore, it greatly enhances the efficiency and performance of the robot and reduces the waste of manpower.

BRIEF DESCRIPTION OF THE DRAWINGS

The present invention may become more understandable with the following description and the references to the drawings.

DETAILED DESCRIPTION OF THE PREFERRED EMBODIMENT

The present invention may become more understandable with the following description and the references to the drawings. However, it should be understood that the figures and charts are provided in an illustrative manner rather than a restrictive manner.

Figure 1:
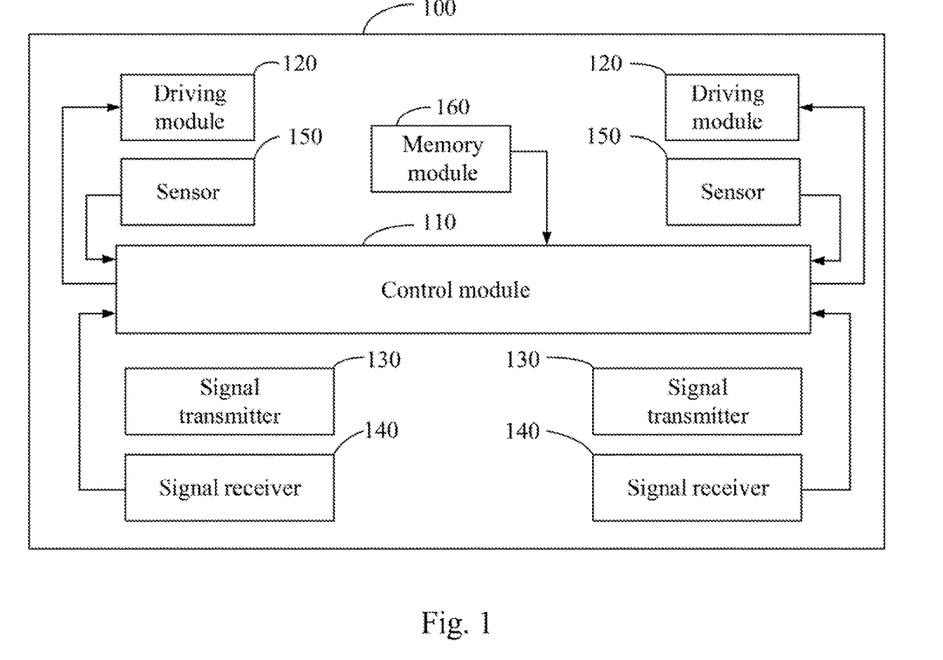
FIG. 1 is a schematic figure illustrating the module structure of the main body of the robot of the present invention.

As illustrated in FIG. 1, which is a schematic figure illustrating the module structure of the main body of the robot of the present invention, the robot of the present invention comprises a main body 100, a control module 110, a plurality of driving modules 120, a plurality of signal transmitters 130, a plurality of signal receivers 140 and a plurality of sensors 150. The control module 110 is disposed inside the main body 100. The driving modules 120, signal transmitters 130, signal receivers 140 and sensors 150 are disposed on the sides of the main body 100.

Wherein, the control module 110 controls the driving modules 120 for driving the main body 100 to move alongside a wall. As the main body 100 moves alongside the wall, the signal transmitters 130 send out signals towards the wall and then the signal receivers 140 receive the bounced-back signals from the wall. Said signals can be infrared radiation, laser, electromagnetic wave or energy beam.

When the main body 100 touches the wall and one of the sensor 150 would be activated, which triggers the control module 110 to control the driving modules 120 for moving the main body 100 away from the wall. Then, the control module 110 generates a signal characteristic change according to the bounced-back signals received by the signal receivers 140.

Then the control module 110 generates a signal standard value based on the signal characteristic change and then uses the signal standard value to determine a keep-away distance that should be kept between the main body 100 and the wall. Then, the control module 110 controls the driving modules 120 for making the main body 100 move alongside the wall and keep said keep-away distance from the wall in the meantime. With the association of the control module 110 and signal standard values, the main body 100 of the robot is capable of automatically adjusting moving paths. Therefore, the present invention enhanced the robot's efficiency and performance.

The control module 110 further comprises a memory module 160. Bounced-back signals, signal characteristic changes and signal standard values are stored in said memory module 160.

When the main body 100 is in motion, if bounced-back signals received by the signal receivers 140 are inconsistent with the signal standard value or if the properties of the wall has changed, the control module 110 would control the driving modules 120 for driving the main body 100 towards the obstacle until the main body actually touches the wall and activates one of the sensors 150. Then, the control module 110 directs the driving modules 120 to move the main body 100 away from the wall. Said wall's properties include its color or superficial smoothness.

If the signal receivers 140 receive no signals when the main body 100 is in motion, the control module 110 controls the driving modules 120 to re-direct the main body 100 and then move alongside the wall.

Figure 2:
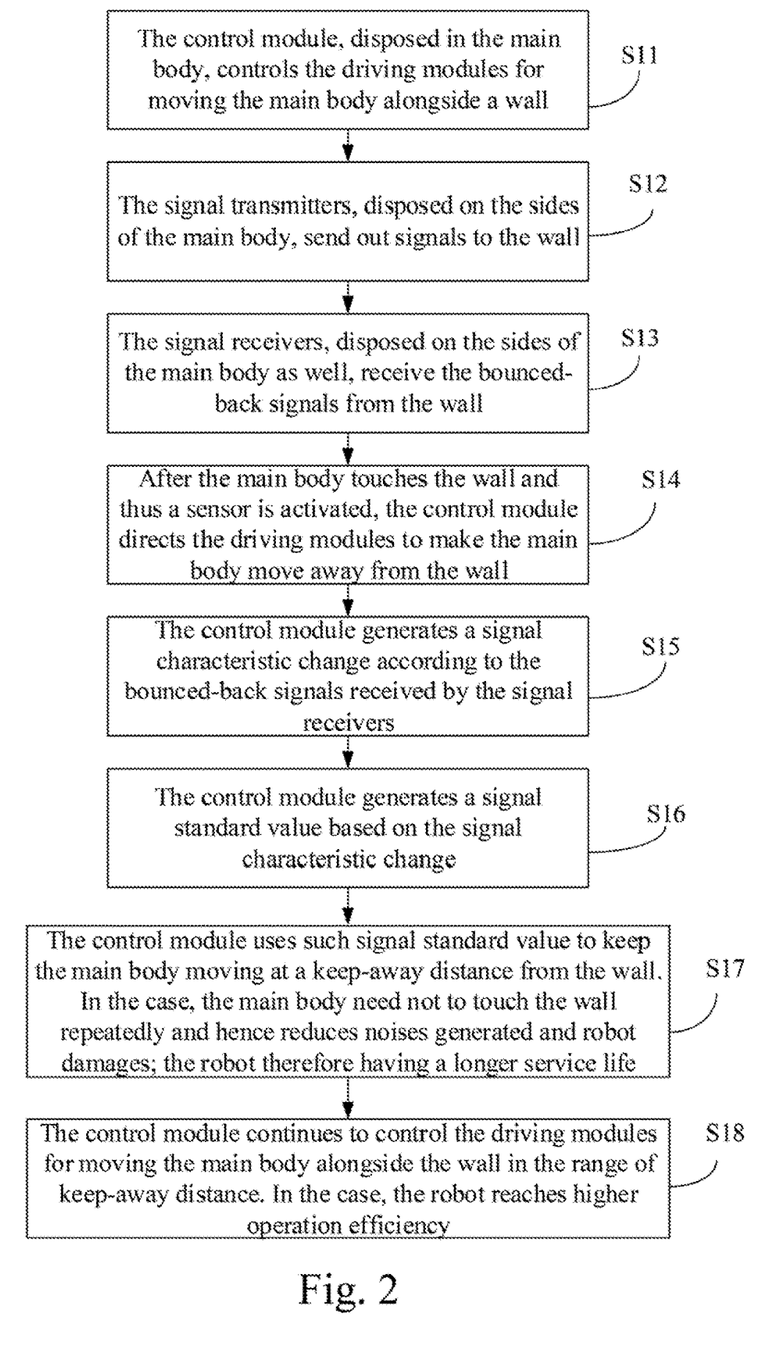
FIG. 2 is a flowchart illustrating the procedure of the method of the present invention.

Please refer to FIG. 2, which is a flowchart schematically illustrating the procedure of the method of the present invention. The procedure at least comprises the following steps:

S11: The control module, disposed in the main body, controls the driving modules for moving the main body alongside a wall.

S12: The signal transmitters, disposed on the sides of the main body, send out signals to the wall.

S13: The signal receivers, disposed on the sides of the main body as well, receive the bounced-back signals from the wall.

S14: After the main body touches the wall and thus a sensor is activated, the control module directs the driving modules to make the main body move away from the wall.

S15: The control module generates a signal characteristic change according to the bounced-back signals received by the signal receivers.

S16: The control module generates a signal standard value based on the signal characteristic change.

S17: The control module uses such signal standard value to keep the main body moving at a keep-away distance from the wall. In the case, the main body need not to touch the wall repeatedly and hence reduces noises generated and robot damages; the robot therefore having a longer service life.

S18: The control module continues to control the driving modules for moving the main body alongside the wall in the range of keep-away distance. In the case, the robot reaches higher operation efficiency.

Figure 3:
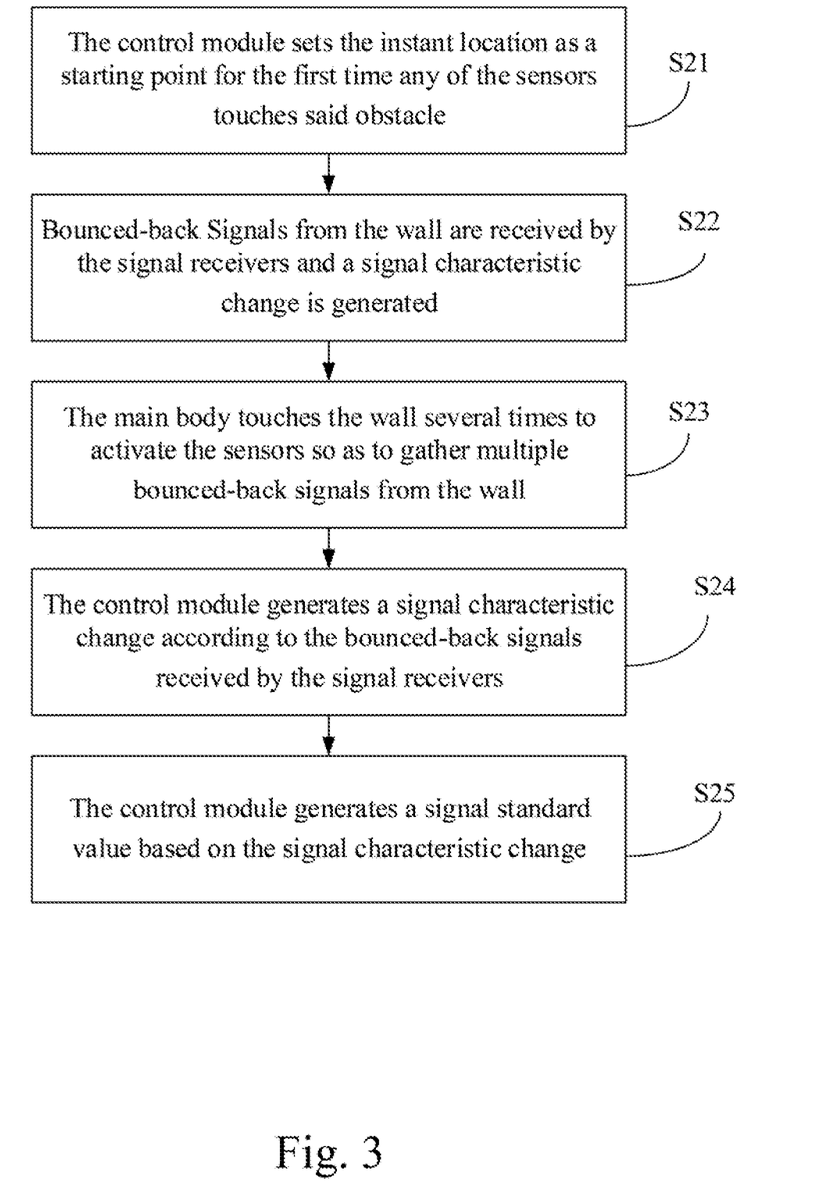
FIG. 3 is another flowchart illustrating the procedure of the method of the present invention.

Also, please see FIG. 3, which is another flowchart illustrating the procedure of the method of the present invention, comprises:

S21: The control module sets the instant location as a starting point for the first time any of the sensors touches said obstacle.

S22: Bounced-back Signals from the wall are received by the signal receivers and a signal characteristic change is generated.

S23: The main body touches the wall several times to activate the sensors so as to gather multiple bounced-back signals from the wall.

S24: The control module generates a signal characteristic change according to the bounced-back signals received by the signal receivers.

S25: The control module generates a signal standard value based on the signal characteristic change.

The control module 110 further comprises a memory module 160, in which bounced-back signals, signal characteristic changes and signal standard values are stored.

If the bounced back signals from the wall is inconsistent with the signal standard value or the properties of the wall changes when the main body 100 moves alongside the wall, the control module 110 would control the driving modules 120 to move the main body 100 towards the wall until the main body reaches the wall. Then, the control module 110 would control the driving modules 120 to move the main body 100 away from the wall. With the association of the control module 110 and signal standard values, the main body 100 is able to reduce errors and misjudgments due to different properties of the wall. Said properties of the wall include its color and superficial smoothness.

If the signal receivers 140 receives no signals when the main body 100 moves alongside the wall, the control module 110 would control the driving modules 120 to re-direct the main body 100 and then move alongside the wall. That advanced the operation of the robot meanwhile saved manpower substantially.

Figure 4:
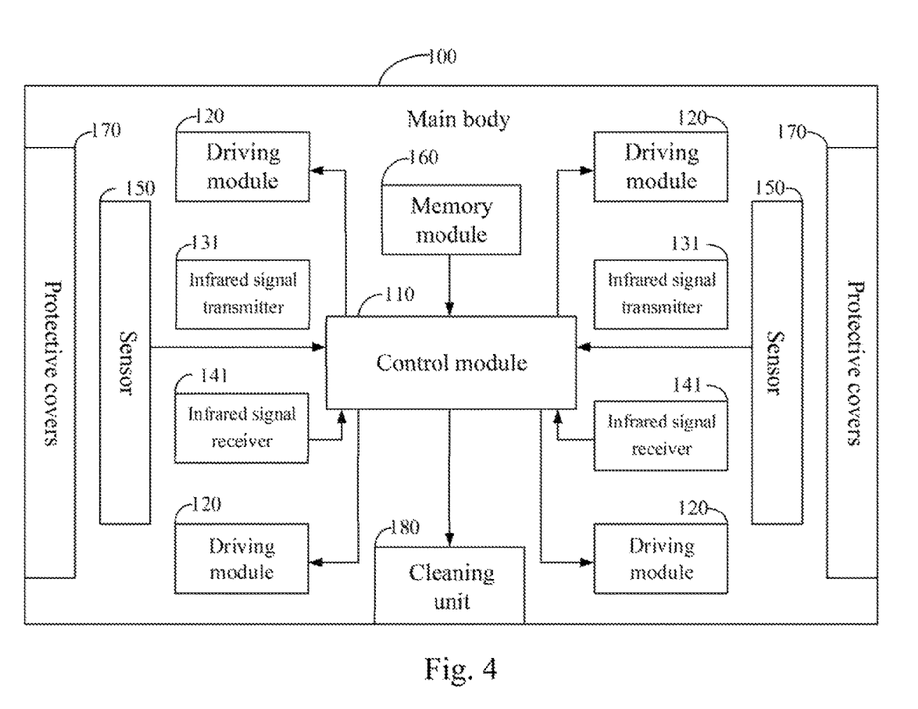
FIG. 4 is another schematic figure illustrating the module structure of the main body of the robot of the present invention.

Then, please refer to FIG. 4, which is a schematic figure illustrating another structure of the main body of the robot of the present invention. In the structure, the robot comprises a main body 100, a control module 110, a plurality of driving modules 120, a plurality of infrared signal transmitters 131, a plurality of infrared signal receivers 141, a plurality of sensors 150, a memory module 160, a plurality of protective covers 170 and a cleaning unit 180.

Figure 5:
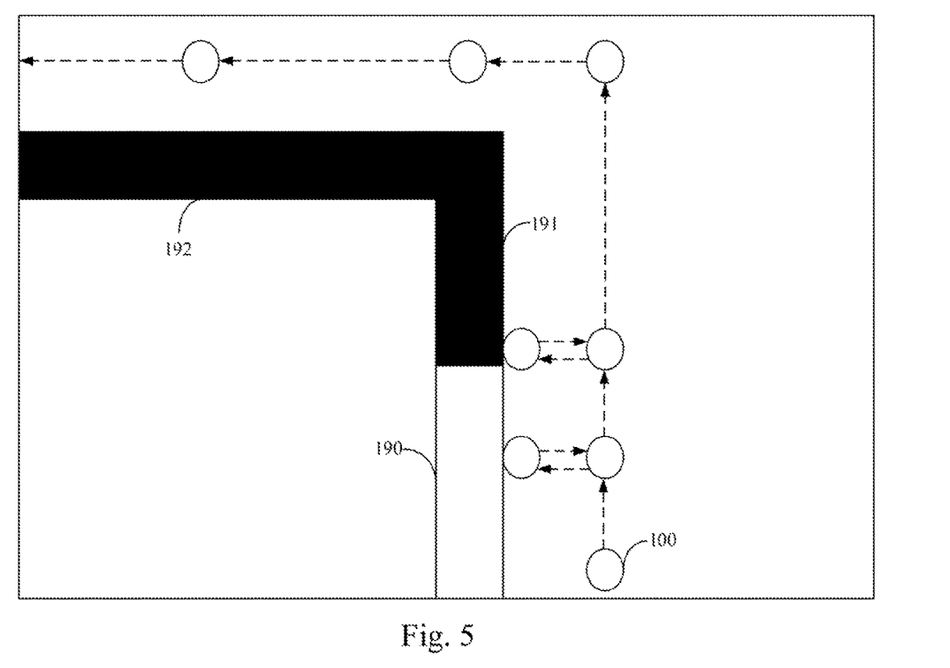
FIG. 5 is a schematic figure illustrating how the robot of the present invention operates.

Please see FIG. 4 and FIG. 5, which is a schematic figure illustrating how the robot of the present invention operates. The control module 110, which is disposed inside the main body 100, controls the driving modules 120 disposed on the sides of the main body 100 for moving the main body 100 to alongside a white wall 190. The infrared signal transmitters 131, which are disposed on the sides of the main body 100, can send infrared signals to the white wall 190. The infrared signal receivers 141, which are disposed on the sides of the main body 100, can receive bounced-back infrared signals from the white wall 190. With the infrared signal transmitters 131 and the infrared signal receivers 141, the robot can detect obstacles efficiently and the production cost can also be reduced.

A protective cover 170 is disposed on either side of the main body 100. The sensors 150 are disposed on each sides of the main body 100. When the robot touches the white wall 190, the protective cover 170 may retract slightly towards the main body 100 so that a sensor 150 can be pressed then activated. Now, the sensor 150 sends a touch signal to the control module 110, which then controls the driving modules 120 to move the main body 100 away from the white wall 190. Next, the control module 110 controls the driving modules 120 to continue to move the main body 100 forwards.

At the moment, the control module 110 sets the instant location as a starting point since it is the first time the sensor 150 touches the white wall 190 and the bounced-back infrared signals from the white wall are gathered by the main body. Next, the control module 110 generates a signal characteristic change according to the bounced-back infrared signals and then generates a signal standard value based on the signal characteristic change. The control module 110 determines the keep-away distance between the main body 100 and the white wall 190 based on the signal standard value. After the keep-away distance is determined, the control module 110 can control the driving modules 120 to move the main body 100 in such manner—moving alongside the white wall 190 and keeping the keep-away distance between them.

With the control module 110 and signal standard values, the protective covers 170 of the robot need not to touch the white wall 190 many times for determining said keep-away distance between the main body and the white wall 190. It reduced the noises and damages of the robot and extends the robot's service life.

As the main body 100 moves alongside the white wall 190 and going to reach another black wall 191, the bounced-back infrared signals received by the infrared signal receivers would become weaker and inconsistent with the signal standard value. Now, the control module 110 would control the driving modules 120 for moving the main body 100 towards the black wall 191. When the robot touches the black wall 191 and the sensor 150 is activated, a touch signal is sent to the control module 110, which then would control the driving modules 120 to move the main body 100 away from the black wall 191.

With the association of the control and computing module 110 and signal standard values, the robot, when encountering obstacles with different properties, still can determine a proper keep-away distance from the obstacle. Therefore, when the robot encounters an obstacle that may bounce back a strong infrared signal, even that the obstacle is far away from the robot, it would not affect the performance of the robot; also, when the robot encounters an obstacle that bounces back a weak infrared signal, the robot would not have a violent collision with the obstacle.

When the infrared signal receivers 141 receives no signal as the main body 100 moves alongside the black wall 191, the control module 110 would control the driving modules 120 to re-direct the main body 100 to make a turn and then move alongside the next black wall 192.

The control module 110 further comprises a memory module 160, in which bounced-back infrared signals, touch signals, signal characteristic changes and signal standard values may be stored.

A cleaning device 180 is disposed inside the main body 100. During the main body 100 moves alongside the white wall 190 and the black wall 191 and the main body's protective cover touches these two walls 190 and 191, and as the main body 100 continues to go forwards beyond the two walls 190 and 191, the control module 110 controls the cleaning device 180 to collect the dust and debris from the floor. Therefore, the areas covered by the walls 190 and 191 is therefore be cleaned up.

Although a preferred embodiment of the present invention has been described in detail hereinabove, it should be understood that the preferred embodiment is to be regarded in an illustrative manner rather than a restrictive manner, and all variations and modifications of the basic inventive concepts herein taught still fall within the scope of the present invention.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. An auto-redirecting robot, comprising:
   a main body;
   a control module, wherein said control module is disposed in the main body;
   a plurality of driving modules, wherein the plurality of driving modules are disposed in the sides of the main body, characterized in that the control module directs the plurality of driving modules, so that the plurality of driving modules guide the main body to move alongside an obstacle;
   a plurality of signal transmitters, wherein the plurality of signal transmitters are disposed in the sides of the main body, characterized in that the plurality of signal transmitters keep sending out signals to the obstacle as the main body is moving alongside said obstacle;
   a plurality of signal receivers, wherein the plurality of signal receivers are disposed in the sides of the main body, characterized in that the plurality of signal receivers receive bounced-back signals from the obstacle; and
   two sensors, wherein the two sensors are disposed in two-sides of the main body respectively, characterized in that as the main body touches the obstacle and one of the sensors is activated, the control module redirects the plurality of driving modules for moving said main body away from the obstacle;
   wherein the control module generates a signal characteristic change based on the bounced-back signals received by the plurality of signal receivers,
   and characterized in that the control module generates a signal standard value based on said signal characteristic change and determines a keep-away distance based on the signal standard value,
   and characterized in that the control module controls the plurality of driving modules for keeping said keep-away distance between the main body and said obstacle while the main body moves alongside the obstacle, so that the main body needs not to touch the obstacle repeatedly; and
   wherein if properties of said obstacle change or the bounced-back signals are inconsistent with the signal standard value, the control module directs the plurality of driving modules for moving the main body towards the obstacle until one of the two sensors is activated by the obstacle, then the control module directs the plurality of driving modules for moving the main body away from the obstacle.

2. The auto-redirecting robot of claim 1, characterized in that the properties of said obstacle comprising the color and the superficial smoothness of the obstacle.

3. The auto-redirecting robot of claim 1, characterized in that if the plurality of signal receivers receive none of the bounced-back signals, the control module directs the plurality of driving modules for redirecting the main body and then move alongside the obstacle.

4. The auto-redirecting robot of claim 1, wherein the control module further comprises a memory module, in which said bounced-back signals, said signal characteristic change and said signal standard value are stored.

5. The auto-redirecting robot of claim 1, wherein the bounced-back signals are infrared radiation, laser, electromagnetic wave or energy beam.

6. A method of robot auto-redirecting, comprising the steps of:
   a control module disposed in a main body directing a plurality of driving modules, so that the plurality of driving modules make the main body move alongside an obstacle;
   a plurality of signal transmitters disposed in sides of the main body, sending out signals to the obstacle;
   a plurality of signal receivers disposed in the sides of the main body, receiving a bounced back signal bounced back by the obstacle;
   two sensors disposed in two sides of the main body respectively, as the main body touching the obstacle and one of the sensors being activated, the control module redirecting the plurality of driving modules to move the main body away from the obstacle;
   wherein the control module generates a signal characteristic change based on the bounced-back signal received by the plurality of signal receivers,
   the control module generates a signal standard value based on the signal characteristic change,
   the control module calculates a keep-away distance between the main body and the obstacle based on the signal standard value, and
   the control module directs the plurality of driving modules for moving the main body alongside the obstacle from said keep-away distance, so that the main body needs not to touch the obstacle repeatedly;
   wherein if properties of said obstacle change or the bounced-back signal is inconsistent with the signal standard value, the control module directs the driving modules for moving the main body towards the obstacle until one of said two sensors is activated by the obstacle, then the control module directs the plurality of driving modules for moving the main body away from the obstacle.

7. The method of robot auto-redirecting of claim 6, further comprising:
   the control module setting an instant location as a starting point for the first time any of the sensors touches said obstacle; and
   said bounced-back signal being received by the plurality of signal receivers since the main body left the starting point and then said signal characteristic change being generated.

8. The method of robot auto-redirecting of claim 7, further comprising:
   one of said two sensors of the main body touching the obstacle multiple times so as to gather said bounced-back signal multiple times,
   the control module generating said signal characteristic change based on the bounced-back signal, and
   the control module generating said signal standard value based on the signal characteristic change.

9. The method of robot auto-redirecting of claim 6, characterized in that the properties of said obstacle comprising the color and the superficial smoothness of the obstacle.

10. The method of robot auto-redirecting of claim 6, characterized in that if the plurality of signal receivers receive none of the bounced-back signal, the control module directs the plurality of driving modules for redirecting the main body and then move alongside the obstacle.

11. The method of robot auto-redirecting of claim 6, wherein the control module further comprises a memory module, in which said bounced-back signal, said signal characteristic change and said signal standard value are stored.

12. The method of robot auto-redirecting of claim 6, wherein the bounced-back signal is infrared radiation, laser, electromagnetic wave or energy beam.

\* \* \* \* \*